March 17, 1953     A. T. GALE     2,631,682

REAR AXLE SUSPENSION

Filed Jan. 17, 1950

INVENTOR.
Andrew T. Gale.
BY Harness and Harris
ATTORNEYS.

Patented Mar. 17, 1953

2,631,682

UNITED STATES PATENT OFFICE 2,631,682

REAR AXLE SUSPENSION

Andrew T. Gale, Highland Park, Mich., assignor to Chrysler Corporation, Highland Park, Mich., a corporation of Delaware Application January 17, 1950, Serial No. 138,985

3 Claims. (Cl. 180—73)

My invention relates to vehicles and more particularly to motor vehicle suspension systems.

In the past many vehicle suspension systems have employed a plurality of bumper pads for preventing the rear axle and its associated differential of a vehicle from striking the under side thereof.

It is a principal object of my invention to provide motor vehicle suspension systems with an improved arrangement of bumper pads which includes fewer bumper pads than those systems commonly known to the art.

Another object of my invention is to provide a vehicle suspension with an improved arrangement of parts for preventing the differential housing and axles of the vehicle from striking the under parts of the vehicle.

A further object of my invention is to provide an improved suspension system which is not only simple in construction but economical to manufacture.

Other objects and advantages will become more apparent from the following description of one embodiment of my invention, reference being had to the accompanying drawings in which.

Figure 1:
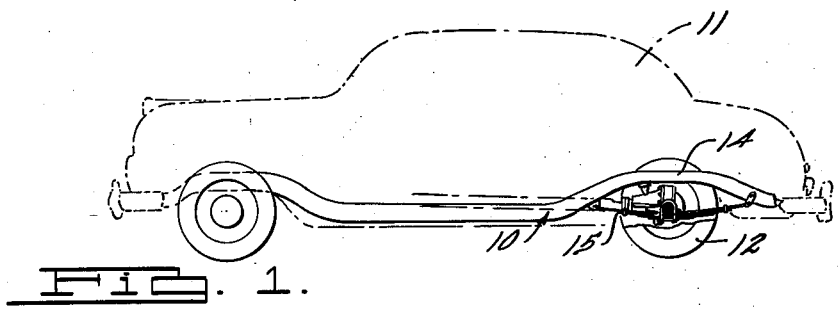
Fig. 1 is a side elevational view of a vehicle frame structure embodying my invention.

In the drawings there is shown a motor vehicle frame structure generally designated by the numeral 10 which carries a conventional body 11 and is supported relative to the ground by conventional drive wheels 12. If desired the body 11 and frame structure 10 may be formed as a unit.

Figure 2:
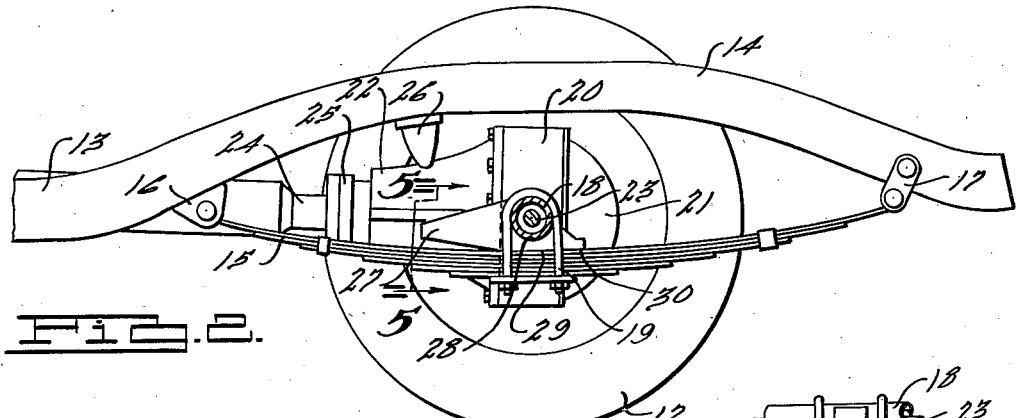
Fig. 2 is an enlarged elevational view of the rear suspension of the vehicle shown in Fig. 1 illustrating the components of my invention when the vehicle is at rest and under light static load.
Figure 5:
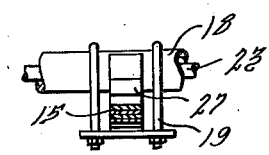
Fig. 5 is an elevational view taken on the line 5—5 of Fig. 2.

Referring more particularly now to Fig. 2, the frame structure 10 is provided with a pair of longitudinally extending side rails, one of which is shown at 13 and each of which is provided with a rearwardly disposed bowed portion 14. For the purpose of simplicity, the description is limited to one suspension only. A conventional leaf spring assembly 15 has one end pivotally connected to a bracket 16 which is secured to the bowed portion 14 of the side rail 13 adjacent one end thereof. The other end of the leaf spring 15 is pivotally connected to a shackle 17 which in turn is pivotally connected to the bowed portion 14 adjacent the other end thereof. The spring 15 substantially spans the entire length of the bowed portion 14 and is secured to an axle housing 18 by a U-clamp 19 at each side of the spring assembly 15, the housing being disposed above the spring. The housing 18 is of conventional construction having a banjo portion 20 which houses a differential (not shown), the latter being enclosed on one side by a hat portion 21 and on the other side by an enclosure 22. The differential operatively connects an axle 23 which is disposed within the housing 18 and a propeller shaft 24, the latter being connected thereto through a universal joint 25.

The bowed portion 14 of the side rail 13 is provided with a bumper pad 26 which is secured thereto at a location on the bowed portion between the bracket 16 and a point on the bowed portion directly above the axle housing 18. The bumper pad 26 is utilized to prevent the axle housing 18 from striking the bowed portion 14 of the side rail 13 during jounce of its associated wheel 12. Further the bumper pad prevents the top of the banjo portion 20 from striking the under side of the vehicle body which is generally disposed slightly above the top of the bowed portion 14. To accomplish this the bumper pad 26 which is preferably made of yieldable rubber-like material is struck by one end of a lever 27, the other end of the lever 27 being secured to the axle housing 18 at a location substantially below the bowed portion 14 and above the spring 15. The lever 27 may be welded or otherwise suitable secured to the housing 18 so that it extends substantially longitudinally of the vehicle. In the more limited aspects of my invention I have provided the lever 27 with a generally semi-cylindrical opening 28 in its upper face receiving the portion of the axle housing between the U-clamps 19. The under face of the lever 27 below the opening 28 is formed with a substantially flat face portion 29 which fits the upper face of the spring assembly 15 and preferably extends rearwardly of the clamps 19 at 30. The lever 27 is thus securely positioned against accidental displacement between the spring assembly 15 and the axle housing 18, the U-clamps 19 fastening these parts together as illustrated. If desired the lever 27 may be welded to the axle housing 18 as aforesaid.

Figure 4:
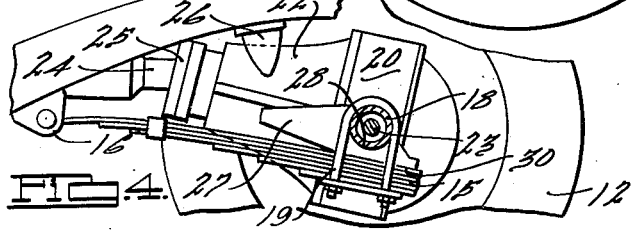
Fig. 4 is an enlarged elevational view similar to Figs. 2 and 3 showing the rear suspension with engine torque applied thereto.

As viewed in Fig. 4, the forward portion of the spring 15 is bowed upwardly in response to the torque applied to the differential and wheels by the propeller shaft 24 when the vehicle is in motion. It may be readily seen, therefore, as in Fig. 4, that the axle housing 18 is closer to the bowed portion 14 of the side rail 13 when the vehicle is in motion. Under these conditions the differential housing assembly which comprises the hat portion 21, the enclosure 22 as well as the axle housing 18 and banjo portion 20, would extend upwardly a great distance when a severe jounce of the wheel occurs.

Figure 3:
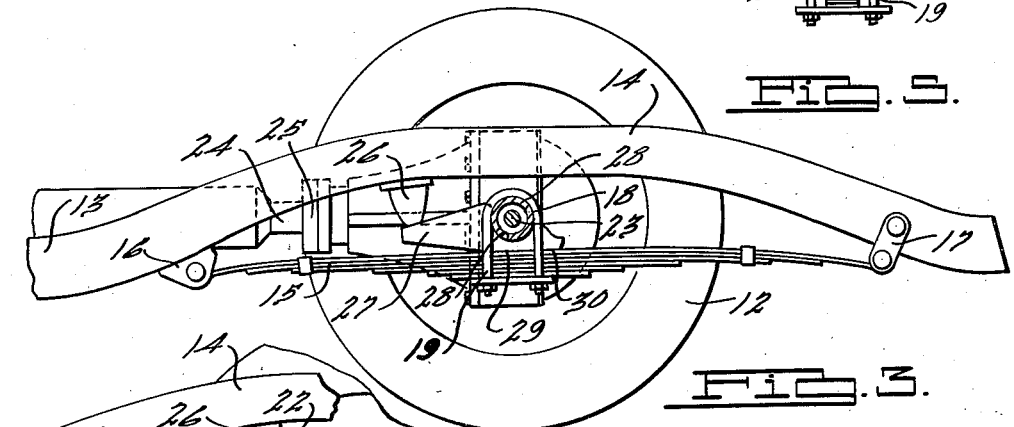
Fig. 3 is an enlarged elevational view similar to Fig. 2 showing the rear suspension of the vehicle under jounce.

In Fig. 3, I have shown the wheel 12 extended upwardly during jounce. It may be readily seen that the bumper pad 26 has engaged the lever 27 and has rotated the axle housing as well as the differential assembly counterclockwise as viewed in the drawings to substantially align the axle housing and differential assembly as they were when the vehicle is at rest as in Figs. 1 and 2. The lever 27 has been rotated counterclockwise by the pressure of the bumper 26 against the torque applied by the propeller shaft 24. Further, the bumper pad 26 resists any further upward vertical movement of the axle.

Under conventional construction the rear suspensions of vehicles are provided with bumper pads disposed on the bowed portion directly above the axle housing as well as another bumper pad disposed substantially forwardly of the bowed portion adjacent the bracket 16 to engage the forward portion of the spring 15. I have provided one bumper pad 26 disposed at a predetermined location slightly forwardly of the center of the bowed portion 14 in order that the bumper pad may strike one end of the lever 26 not only to prevent the differential assembly and axle housing from striking those components disposed above them but also to unwind the spring 15 against the torque applied by the propeller shaft 24. The size of the lever may be predetermined in accordance with the dimensions of the bowed portion and in accordance with the amount of torque delivered by the propeller shaft 24 relative to the stress applied on the spring 15.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. A vehicle including sprung and unsprung portions, said sprung portion including a frame member having a bowed portion and a body member secured to and having a portion carried by said frame member, said unsprung portion including wheel carrying means disposed below a predetermined point on said bowed portion and a driven shaft drivingly connected through universal joint and a differential to said wheel carrying means, said driven shaft being adapted to apply a torque to said differential to rotate the forward portion thereof towards said body member, a suspension system comprising a leaf spring operatively connected between said wheel carrying means and said frame member, said leaf spring being adapted to transmit drive from said wheel carrying means to said frame member, a lever secured to said wheel carrying means and extending outwardly therefrom, and a bumper pad secured to said bowed portion at a location spaced forwardly of the vehicle from said predetermined point, said pad being adapted to strike said lever to prevent said wheel carrying means from striking said body member and said frame member and to partially rotate said forward portion of said differential away from said body member against the force of the torque applied thereto.

2. A vehicle including sprung and unsprung portions, said sprung portion including a frame member having a bowed portion and a body member secured to and having a portion carried by said frame member, said unsprung portion including wheel carrying means disposed below a predetermined point on said bowed portion and a driven shaft drivingly connected through a universal joint and a differential to said wheel carrying means, said driven shaft being adapted to apply a torque to said differential to rotate the forward portion thereof towards said body member, a suspension system comprising a leaf spring operatively connected between said wheel carrying means and said frame member, and a bumper pad secured to said bowed portion at a location spaced forwardly of the vehicle from said predetermined point, said pad being adapted to strike said wheel carrying means to prevent said wheel carrying means from striking said body member and said frame member and to partially rotate said forward portion of said differential away from said body member against the force of the torque applied thereto.

3. A vehicle including a frame member having a bowed portion, a body member secured to and having a portion carried by said frame member, wheel carrying means disposed below said bowed portion, power means including a driven shaft drivingly connected through a differential to said wheel carrying means, said driven shaft being adapted to apply a torque to said differential to rotate the forward portion thereof towards said body member, a suspension system comprising a leaf spring operatively connected between said wheel carrying means and said frame member, a lever extending outwardly from said wheel carrying means, a securing device clampingly holding said lever between said spring and said wheel carrying means, and a bumper pad secured to said bowed portion, said pad being adapted to strike said lever to prevent said wheel carrying means from striking said body member and said frame member and to partially rotate said forward portion of said differential away from said body member against the force of the torque applied thereto.

ANDREW T. GALE.

REFERENCES CITED

The following references are of record in the file of this patent:

UNITED STATES PATENTS

| Number | Name | Date |
|---|---|---|
| 1,933,675 | Marcum | Nov. 7, 1933 |
| 2,322,890 | Slack | June 29, 1943 |
| 2,518,733 | Walker | Aug. 15, 1950 |